United States Patent [19]

Strauss

[11] 4,104,655
[45] Aug. 1, 1978

[54] CAMERA WITH AUTOMATIC EXPOSURE CONTROL SYSTEM

[75] Inventor: Karl-Peter Strauss, Volkmarode, Germany

[73] Assignee: Rollei-Werke Franke & Heidecke, Braunschweig, Germany

[21] Appl. No.: 752,053

[22] Filed: Dec. 20, 1976

[30] Foreign Application Priority Data

Dec. 23, 1975 [DE] Fed. Rep. of Germany ....... 2558254

[51] Int. Cl.² ............................................... G03B 7/08
[52] U.S. Cl. ..................................... 354/38; 354/60 L
[58] Field of Search ....................... 354/28, 29, 30, 36, 354/37, 38, 23 D, 60 R, 60 A, 60 E, 60 L

[56] References Cited

U.S. PATENT DOCUMENTS

| 4,011,569 | 3/1977 | Mashimo et al. ...................... 354/38 |
| 4,015,198 | 3/1977 | Iwashita et al. ...................... 354/29 |

Primary Examiner—L. T. Hix
Assistant Examiner—M. L. Gellner
Attorney, Agent, or Firm—Stonebraker, Shepard & Stephens

[57] ABSTRACT

A camera having means for manually preselecting the value of one of the two main exposure factors (shutter speed and diaphragm aperture) and means for automatically setting the other of these two exposure factors, in response to prevailing light conditions. If the available range of the automatically set factor is not sufficient to provide an acceptable exposure value in view of prevailing light conditions, then the automatic mechanism moves the previously selected or preset exposure factor to a value which will give an acceptable exposure value. Relatively simple and inexpensive circuitry is provided to accomplish this, and to enable the exposure values to be set entirely manually rather than automatically, if desired.

15 Claims, 5 Drawing Figures

CAMERA WITH AUTOMATIC EXPOSURE CONTROL SYSTEM

BACKGROUND OF THE INVENTION

Among the many kinds of photographic cameras which are known in the art, there are cameras wherein the diaphragm aperture is preselected, and then the shutter speed (duration of exposure) is automatically set to give an optimum exposure value as a result of prevailing illumination of the subject being photographed. Likewise there are known cameras operating the opposite way, wherein the user first preselects and manually sets the shutter speed (time of exposure) and then the automatic mechanism automatically sets the diaphragm aperture in accordance with the illumination of the subject. In both of these types of cameras it sometimes happens, however, that the preselected factor will not result in an optimum exposure value for any possible setting within the available range of the other factor which is to be set automatically. For example, in a given camera, the available range of setting the diaphragm aperture may be from $f/2.8$ to $f/16$. Suppose, for example, that the photographer preselects the shutter speed as 1/200th of a second. The automatic setting mechanism will then attempt to find and set an appropriate diaphragm aperture value which will give an acceptable exposure under prevailing light conditions when the shutter speed is 1/200. But if the subject being photographed is only faintly illuminated, it may well be that a shutter speed of 1/200 is too fast to obtain adequate exposure even if the diaphragm is opened wide to its extreme limit of $f/2.8$. Under these conditions, since the diaphragm cannot be opened any farther to a larger aperture, it is necessary to use a slower shutter speed, such as 1/100 instead of 1/200. This is automatically accomplished by the mechanism of the present invention. The present invention also operates to shift the shutter speed to a faster speed (shorter duration of exposure) if an acceptable exposure cannot be obtained when the diaphragm aperture is stopped down to its smallest aperture. Likewise, the invention operates similarly with the reverse arrangement, where the diaphragm aperture is selected manually and the shutter speed is then set automatically. If it is not possible for the automatic setting mechanism to select a shutter speed which will give an optimum exposure, within the available range of shutter speeds and at the preselected diaphragm aperture, then the mechanism of the present invention will shift the diaphragm aperture to such extent as may be necessary to produce an optimum exposure.

As well known in the art, there are three exposure factors which must be considered when taking a picture. One is the factor of shutter speed (that is, duration of each exposure), another is the diaphragm aperture or stop, and the third is the factor of film sensitivity or film speed. For purposes of the present discussion, the two basic exposure factors are shutter speed and diaphragm aperture, which frequently need to be varied from one exposure to the next, whereas the factor of film sensitivity is relatively constant, as it is always the same for any one loading of the camera with a roll of film, and needs to be changed only when the camera is loaded with a fresh roll of film having a different sensitivity or film speed.

An object of the present invention is the provision of an improved camera which will operate in the manner above indicated, i.e., in which one exposure factor is normally preselected and set manually, and the other of the two main exposure factors is then selected and set automatically without changing the first factor, but which will actually change the preselected first factor automatically if such a change is necessary in order to achieve an optimum exposure.

Another object is to provide a camera of the above stated kind with minimum possible circuitry expense, so that it can be of cost-favorable and space-saving construction and so that furthermore by a simple switching measure, preferably by a simple changeover switch, the camera can be converted from the operation manner of priority time setting or of priority diaphragm stop setting into the manner of operation of an automatic time device or an automatic diaphragm device, or into the manner of operation for manual diaphragm and time setting.

SUMMARY OF THE INVENTION

According to the present invention these objects are accomplished by providing apparatus for forming an output signal corresponding to the diaphragm value or exposure time (shutter speed) value in dependence upon the output signals of the light measuring circuit, of the film sensitivity setting member, and of the time or diaphragm setting member, and providing a comparator circuit for comparing the output signal of the diaphragm value or time value formation device with the output signals of the diaphragm or time setting member, and circuit means for superimposing the output signal of the time or diaphragm setting member with the output signal of the comparator circuit, and a gate circuit which permits a superimposition of these two output signals only when the output signal of the diaphragm value or time value formation device corresponds to a diaphragm stop or time which lies above or below a diaphragm or time range set on the diaphragm or time setting member. The output signal of the diaphragm value or time value formation device serves for diaphragm control or shutter time control, and the signal occurring from the superimposition of the output signals of the time or diaphragm setting member and the output signal of the comparator circuit serves for shutter time or diaphragm control.

By a simple switch which in its closed position keeps the gate circuit constantly permeable, in accordance with a further development of the invention in the simplest way the camera can be converted from the manner of operation with priority time setting or diaphragm setting into the manner of operation of an automatic time setting device or automatic diaphragm setting device.

The circuit principle in accordance with the invention can be realized in an especially simple and expedient manner, according to a preferred embodiment of the invention, by providing a first totalling amplifier, the total input of which is connected with the film sensitivity setting member, the output of the light-measuring circuit and the output of a second totalling amplifier, to the total input of which the time or diaphragm setting member is connected by two sum-and-difference amplifiers, of which the one input in each case lies on the output of the first totalling amplifier and the other input is connected with the diaphragm or time-setting member in such manner that the minimum of the set diaphragm or time range lies at the input of the first sum-and-difference amplifier and the maximum at the input of the second sum-and-difference amplifier, and each of whose outputs is connected through a diode to the total input of the second totalling amplifier, the diodes being so arranged that the first diode is connected by its cathode and the second by its anode to the respective output of the first and second sum-and-difference amplifiers. For convenience and brevity, the diaphragm aperture is referred to here and elsewhere in this specification merely as the diaphragm.

By bridging over the diode in the closed position of the already mentioned switch, the camera, which when the switch is in the open position works in the manner of operation with priority time or priority diaphragm setting in the initially described manner, receives the additional possibility of being usable as a time or diaphragm automatic system, where when the diaphragm stop is preselected the time is automatically controlled or when the time is preselected the diaphragm stop is automatically controlled, witholt an additional correction or modification of diaphragm stop or time taking place.

If all the amplifiers are made as operational amplifiers an exposure control system is obtained having a very high degree of accuracy which within a wide range is largely independent of temperature fluctuations.

In the manner of operation for priority time setting or priority diaphragm setting, where the diaphragm or the time is automatically adjusted in a range and on exceeding of this range the preselected time or diaphragm is corrected or modified, according to a further development of the invention this diaphragm or time range can be adjusted in that the diaphragm or time setting member consists of a potentiometer for the setting of the minimum and a potentiometer for the setting of the maximum diaphragm or exposure time value, the potentiometer tappings of which are connected in each case with the sum-and-difference amplifiers.

In order that the camera may where possible work in a large exposure value range, it has appeared advantageous to place the maximum diaphragm or time value, that is to say the maximum diaphragm aperture or the shortest exposure time, always at the lower limit of the diaphragm or exposure time range which can be covered by the camera. In this case it is possible to dispense with one of the two potentiometers if in accordance with a further development of the invention in the diaphragm setting member the potentiometer tapping is connected with the first sum-and-difference amplifier and the potentiometer output with the second sum-and-difference amplifier, or in the case of the time setting member the potentiometer tapping is connected with the second sum-and-difference amplifier and the potentiometer output with the first sum-and-difference amplifier.

According to an improvement constituting another feature of the invention, it is insured that on closure of the switch, with which as mentioned above the camera is convered into the manner of operation of an automatic time device or an automatic diaphragm device, the diaphragm or time setting member is shifted so that the maximum settable diaphragm or exposure time range is set. For the case where, as described above, the diaphragm or time-setting member consists only of a single potentiometer, this signifies that with closure of the switch the potentiometer tapping is shifted into its zero position in which the maximum voltage is tapped. This measure insures that in the case of the manner of operation of the camera as an automatic time or diaphragm device, the whole available time or diaphragm range can be set by the exposure control system. In the other case this settable range would be limited by the existing maximum diaphragm aperture and by the set diaphragm stop or by the existing minimum exposure time and by the set exposure time.

For the conversion of the camera into manual operation, in which both the time and the diaphragm stop are preselected by hand, according to a further development of the invention the initially mentioned switch has a further closure position in which it connects the output of the first sum-and-difference amplifier with the input of this first sum-and-difference amplifier connected to the output of the first totalling amplifier. The preselected diaphragm and time values are thus converted into signals and introduced without any correction into the control circuit for diaphragm and time.

As an alternative to the mechanical changing over of the switch into a further closure position, the output of the first sum-and-difference amplifier can also be connected with the input of this first sum-and-difference amplifier, connected to the output of the first totalling amplifier, through a transistor actuatable in the manual manner of operation of the camera. This is especially expedient in connection with the indicator device mentioned below the set diaphragm and time values.

In the case of such an indicator device for the diaphragm and/or the time values, according to a further development of the invention with each of the indicator device for the diaphragm values and the indicator device for the time values there is associated a luminous diode line, of which the inputs are connected each to the outputs of a decoding circuit connected with an analogue-digital converter, while the input of the analogue-digital converter is connected with the output of the first or of the second amplifier. By conversion of the analogue control signal present at the first and second totalling amplifier into a corresponding digital combination and by the actuation of a luminous diode allocated to the respective digital combinations, in all types of operation of the camera the set or automatically formed diaphragm or time values can be read off on the indicator device.

Furthermore by further simple measures the possibility is obtained that in manual camera operation both the manually preselected time or diaphragm values and the optimum time or diaphragm values which would result in the case of the camera working in automatic operation are simultaneously indicated in a line of liminous diodes. According to a further extension of the invention this measure consists in that the base of the transistor connecting the output and the input of the first sum-and-difference amplifier is connected with a pulse generator which is switched on when the camera is in the manual manner of operation, the pulse sequence of which generator keeps the transistor conductive during a pulse period over a multiple of its blocking time. The initially mentioned switch can here be in its closed or in its open position. In this way the exposure control system of the camera is constantly switched over from the manner of operation with manual setting of the exposure parameters into the automatic manner of operation. In this operation the set and the automatically ascertained diaphragm of time values are indicated alternately in each case by rhythmic flashing of the luminous diodes allocated to these values. As a result of the actuation of the transistor the flashing durations of the luminous diodes are different, so that the manually set values are signalled by a long lighting up of the luminous diode and the automatically ascertained diaphragm or time values by short flashing.

DESCRIPTION OF THE PREFERRED EMBODIMENT

Figure 1:
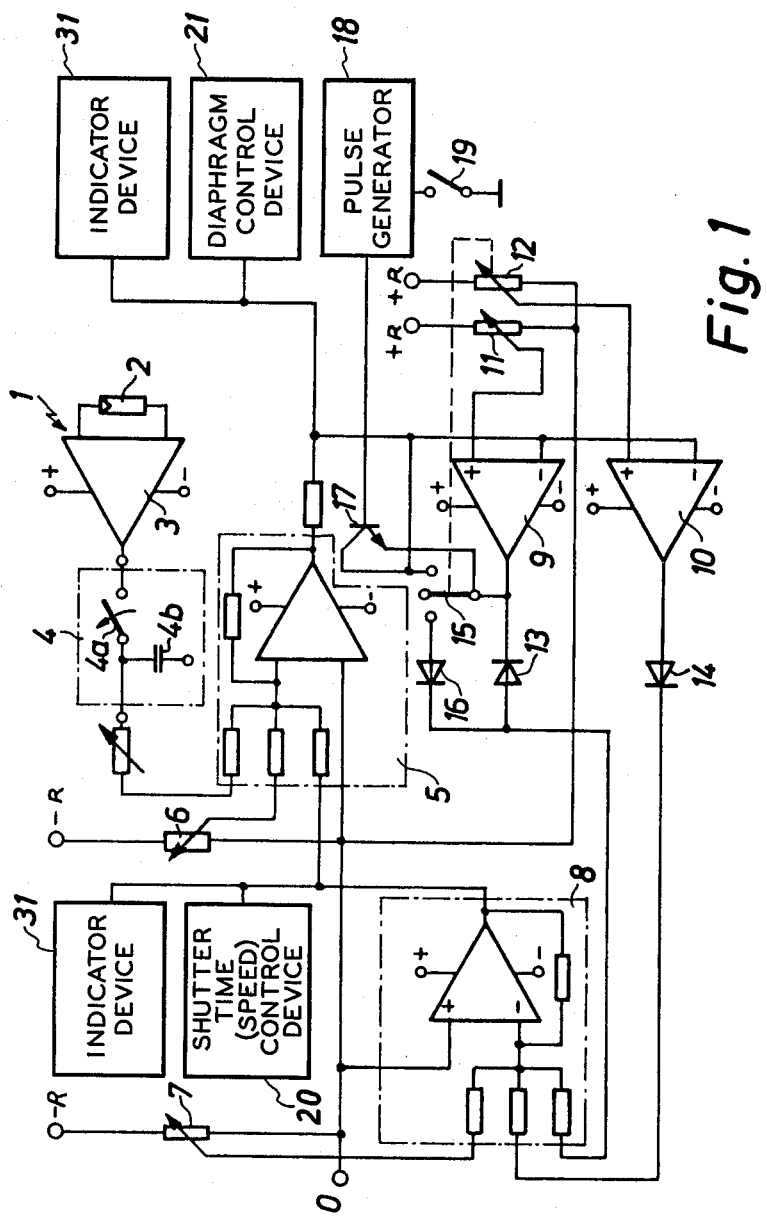
FIG. 1 is a circuit diagram of the exposure control system in accordance with a preferred embodiment of the invention.

The circuit arrangement in FIG. 1 is fed by a direct current voltage source the two connections of which are designated by "+" and "−". The center potential of this voltage source is designated by "0". Reference voltages +R and −R are derived from the voltage source.

The circuit arrangement comprises a light-measuring circuit indicated in general at 1, which comprises a photoelectric cell 2 and a photocell amplifier 3. In the case of single-lens mirror reflex cameras this light-measuring circuit is connected through a storage circuit 4 to the total input of a totalling amplifier 5 which is formed as an adding operation amplifier. This storage circuit in the simplest case can consist of a capacitor 4b and a switch 4a, the switch being closed during the exposure measurement and opened as soon as the mirror of the reflex camera is shifted from its viewfinding position into its picture-taking position. In other types of cameras this storage circuit is omitted and the light measuring circuit is connected directly with the totalling amplifier 5. For the setting of the film sensitivity the circuit comprises a potentiometer 6 which is connected between the reference potential −R and the 0-potential, and the potentiometer tapping of which is likewise connected with the total input of the totalling amplifier 5.

For the setting of the exposure time in a camera with priority exposure time setting or for the setting of the diaphragm value in a camera with priority diaphragm setting, a potentiometer 7 is provided which likewise is connected between the reference potential −R and 0-potential. The tap of this potentiometer is connected to the total input of a second totalling amplifier 8 which is likewise formed as an adding operation amplifier.

The output of the totalling amplifier 8 is connected with the total input of the first totalling amplifier 5. The non-inverting inputs of the two totalling amplifiers 5 and 8 are applied to 0-potential.

The output of the first totalling amplifier 5 is connected with the inverting inputs of a first sum-and-difference amplifier 9 and a second sum-and-difference amplifier 10 which are both formed as operational amplifiers. The non-inverting inputs of these sum-and-difference amplifiers are respectively connected with the potentiometer tappings of the respective potentiometers 11 and 12 which are connected between reference potential +R and 0-potential. In the case of a camera with priority time setting (shutter speed setting) the minimum diaphragm aperture is set on the potentiometer 11 and the maximum diaphragm aperture of the desired diaphragm stop range is set on the potentiometer 12. Priority exposure time setting signifies that with a fixedly preselected exposure time the diaphragm is automatically controlled and the time is corrected or modified towards longer or shorter exposure times only when the maximum or minimum diaphragm aperture of the set diaphragm range is reached.

Figure 5:
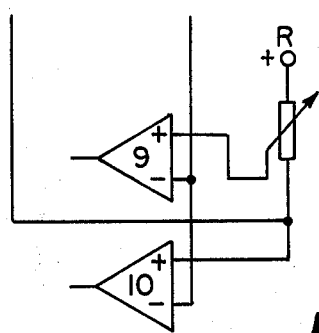
FIG. 5 is a schematic view of a modification of the construction shown near the lower right corner of FIG. 1.

In the case of a camera with priority diaphragm setting, the shortest exposure time of the exposure time range (fastest shutter speed) to be preselected is set with the potentiometer 11 and the longest with the potentiometer 12. Here priority diaphragm setting signifies that the exposure control system works in a manner that with the diaphragm stop fixedly set the time is automatically set and the diaphragm setting is corrected or modified in the direction of larger or smaller diaphragm apertures when the maximum or minimum set time value is reached. Since it has proved expedient, in a camera with priority time setting, to place the one limitation of the diaphragm range at the maximum possible diaphragm aperture, or in a camera with priority diaphragm setting to set the one limitation to the minimum possible time, a simplification is obtained to the effect that in a camera with priority time setting the potentiometer 12 can be omitted and the noninverting input of the second sum-and-difference amplifier 10 can be connected with 0-potential, and that in a camera with priority diaphragm setting the potentiometer 11 can be omitted and the non-inverting input of the first sum-and-difference amplifier 9 can be connected to 0-potential. These possibilities are indicated schematically in FIG. 5.

The output of the first sum-and-difference amplifier is connected through a diode 13 with the total input of the second totalling amplifier 8, the cathode of this diode being connected with the output of the first sum-and-difference amplifier 9. The output of the second sum-and-difference amplifier 10 is connected through the diode 14 likewise with the total input of the second totalling amplifier 8, the anode of the diode 14 here being connected with the output of the sum-and-difference amplifier. When the switch 15 is closed to its left-hand position, the diode 13 is short-circuited. In this case a diode 16 is arranged in the short circuit and connected oppositely to the diode 13. There will be subsequent reference to the significance of this diode.

Between the output of the first sum-and-difference amplifier 9 and its inverting input connected with the output of the first totalling amplifier 5, the collector-emitter path of a transistor 17 is arrange. The base of this transistor is actuated by a pulse generator 18, the pulse generator being switched on by means of a switch 19 only in the case of manual camera operation. In place of the transistor 17 a second closed position can also be provided for the changeover switch 15, in which the switch connects the output of the sum-and-difference amplifier 9 with the inverting input of this sum-and-difference amplifier. The function of the circuit arrangement in the second closed position of the switch 15 is the same as if the transistor 17 were kept constantly conductive. The actuation of the transistor in pulse form is however essential for the function of the indicator devices for time and/or diaphragm values which are to be described hereinafter.

In the case of a camera which comprises an exposure control system with exposure time settable with priority, at the output of the second totalling amplifier 8 the signal is tapped for the control of the exposure time and at the output of the first totalling amplifier 5 the signal for the control of the diaphragm setting is tapped. In the case of a camera having an exposure control system which works with diaphragm settable with priority, the signal for the diaphragm control is tapped at the output of the second totalling amplifier 8 and the signal for the exposure time control is tapped at the output of the first totalling amplifier 5. For this purpose at the output of the second totalling amplifier 8 in the former case a time control device 20 is connected and at the output of the second totalling amplifier 5 a diaphragm control device 21 is connected as illustrated in FIG. 1. In the latter case the connections of the time control device and diaphragm control device are reversed; that is, the device fed from the output of the amplifier 5 would be the shutter time or speed control device, and the device fed from the output of the amplifier 8 would be the diaphragm control device.

Figure 2:
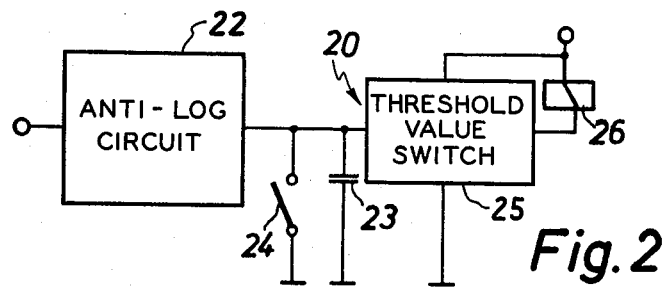
FIG. 2 is a schematic illustration of one embodiment of the shutter time control.

The assembly of a shutter time or speed control circuit 20 is represented by way of example in FIG. 2. Here, with the output of the second totalling amplifier 8 there is connected an anti-logarithm circuit 22, briefly called anti-log circuit, of known construction, which finds the anti-logarithm of the logarithmic analogue signal present at the output of the second totalling amplifier. To the output of this anti-log circuit a capacitor 23 is connected which can be short-circuited by a switch 24. This switch is opened in known manner on opening of the shutter. Parallel with the capacitor a threshold value switch 25 is connected which on reaching of a specific voltage value on the capacitor 23 switches over and de-energizes a relay 26, whereby conventional holding means which holds the shutter open is liberated and the shutter closes.

Figure 3:
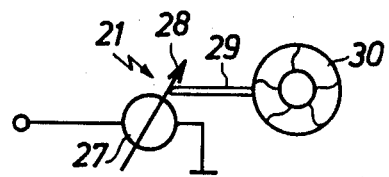
FIG. 3 illustrates further details of the diaphragm control circuit schematically indicated in FIG. 1.

An example of the diaphragm control circuit 21 is represented in FIG. 3. Here, to the output of the first totalling amplifier a known form of measuring mechanism 27 is connected. According to the analogue signal present at the output of the second totalling amplifier, this measuring mechanism turns a meter pointer 28 into a specific position. A scanning device 29 of known form explores the position of the meter pointer and causes a corresponding setting of the diaphragm 30.

Of course shutter time and diaphragm control circuits of other known constructions can be connected to the totalling amplifiers, in place of the specific forms here illustrated. The details of construction of the shutter speed control device and the diaphragm control device are not important so far as the broad aspects of the present invention are concerned.

Figure 4:
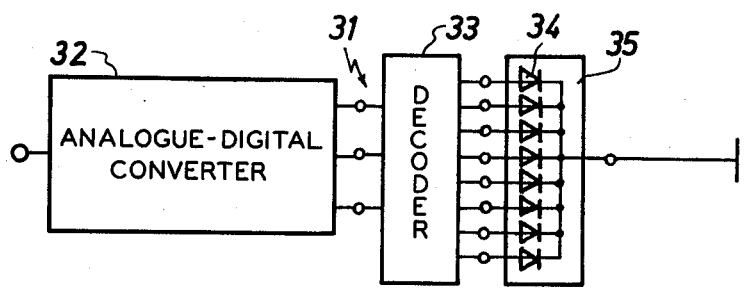
FIG. 4 illustrates further details of the indicator device partially shown schematically in FIG. 1.

For the indication of the time (speed) or diaphragm signal present at the output of the second totalling amplifier 8, and of the diaphragm or time signal present at the output of the first totalling amplifier 5, an indicator device 31 is provided in each case. These two indicator devices are identical and assembled according to FIG. 4. Each indicator device comprises an analogue-digital converter 32 which converts the analogue signal present at the output of the first or second totalling amplifier into a corresponding digital combination. This signal is decoded in a decoding circuit 33 connected with the analogue-digital converter and fed to a particular one of a series of luminous or light emitting diodes 34 arranged in an LED line 35, allocated to one of these digital combinations. This luminous diode 34 lights up and indicates the corresponding exposure time value or diaphragm value, according to whether the indicator device is connected to the first or second totalling amplifier. The light emitting diode line is preferably located so as to be visible in the viewfinder of the camera.

In manual operation of the camera, the switch 19 is closed and the pulse generator 18 is switched on, while the switch 15 is in its open position or in its left-hand closed position bridging over (short circuiting) the diode 13. The base of the transistor 17 is charged with a pulse sequence from the generator 18, the positive pulses having a pulse duration which is several times larger than the pulse duration of the negative pulses. During the duration of a positive pulse the transistor 17 is conductive, so that the entire circuit arrangement is transferred into the manner of operation for manual exposure value setting, and in the indicator device 31 the lighting up of a luminous diode signals the manually set diaphragm value and/or exposure time value. During the brief negative actuation of the transistor 17 the latter is blocked and the circuit arrangement is transferred into the automatic operation, so that the automatically ascertained and thus optimum diaphragm and time values are indicated in the indicator device by short light pulses. Thus in the indicator device in the manner of operation of manual setting of the exposure parameters, the manually set and the optimum exposure values can be compared with one another and the degree of over or under exposure to be expected can be pre-estimated.

The manner of operation of the above described circuit arrangement of the exposure control system is described below, on the basis of an exposure control system which works with priority time setting, that is in which with a fixedly set time the diaphragm is automatically adjusted and when the minimum or maximum value of the set diaphragm stop range is reached the set time is automatically corrected or modified until an optimum exposure value is reached.

(1.) The exposure measuring system is operated in automatic working with priority time setting. For this purpose the switch 15 is to be left in the open position as shown in FIG. 1. The desired preselected time, for example 1/125 second, is to be set on the potentiometer 7. The maximum diaphragm aperture is to be set on the potentiometer 12 and the minimum diaphragm aperture on the potentiometer 11. The potentiometer tapping 12 is preferably driven to its lower stop where the potentiometer tapping is connected with O-potential. Thus the maximum diaphragm aperture, for example diaphragm stop $f/1.4$, is set. So that the maximum possible range of usable exposure values is present, the potentiometer tapping of the potentiometer 11 is driven into its zero position in which the maximum voltage is tapped on the potentiometer, so that the minimum possible diaphragm aperture, in the example diaphragm stop $f/22$, is set. The film sensitivity is introduced by the potentiometer 6.

The subject brightness measured by the light reflected from the subject and reaching the photoelectric cell 2 is converted in the light-measuring circuit 1 into an electric signal and fed to the total input of the first totalling amplifier 5. Likewise the electric signal resulting from the DIN-(ASA) setting by the potentiometer 6 is present at the total input of this totalling amplifier. The electric signal coming from the time setting potentiometer 7 passes to the total input of the second totalling amplifier 8 and is here first merely inverted and passes as an inverted signal to the total input of the first totalling amplifier 5. From the three input signals the totalling amplifier 5 forms an output signal which corresponds to a specific diaphragm value, it being initially assumed that this diaphragm stop lies in the diaphragm range, that is for example the diaphragm aperture f/16. Thus at the inverting input of the first sum-and-difference amplifier 9 there lies a signal voltage which is less than the reference voltage at the non-inverting input and a signal voltage lies at the inverting input of the second sum-and-difference amplifier 10 which is greater than the reference voltage at the non-inverting input of the sum-and-difference amplifier 10. Thus at the output of the first sum-and-difference amplifier 9 there is a positive signal voltage and at the output of the second sum-and-difference amplifier 10 there is a negative signal voltage. Since for these potential voltages the diodes 13, 14 constitute a barrier, no signal can pass from here to the total input of the second totalling amplifier 8. The output signal of the second totalling amplifier 8 passes to the shutter time control circuit 20 and to the indicator device 31 and here effects a shutter release and lighting up of a luminous diode delayed according to the set time. Likewise the signal present at the output of the first totalling amplifier passes to the diaphragm control device 21 and to the diaphragm indicator device 31 and a corresponding automatic diaphragm setting and indication of the ascertained diaphragm value take place.

If on the other hand the totalling amplifier 5 calculates from the three input signals an output signal which corresponds to a diaphragm aperture value which is less than the set minimum diaphragm aperture, then at the inverting inputs of the two sum-and-difference amplifiers 9 and 10 there is a signal voltage which is greater than the signal voltage at the noninverting inputs. While the second sum-and-difference amplifier 10 still remains ineffective, as a result of the blocking action and the diode 14, now at the output of the first sum-and-difference amplifier 9 there is a negative signal voltage which passes through the diode 13 to the input of the second totalling amplifier 8. Now in the totalling amplifier the set time is superimposed by the correction signal coming from the sum-and-difference amplifier 9 and the superimposed signal passes to the total input of the first totalling amplifier 5, whereby its output signal changes, namely so that a shorter time results. Thus here a regulating circuit is formed which is in equilibrium when the output signal at the first totalling amplifier corresponds to the minimum diaphragm aperture value. Since the controlling of this value takes place immediately, both the time control device and the diaphragm control device and also the indicator device are charged only with the regulated signal.

If on the other hand as a result of low subject brightness the first totalling amplifier forms from the three input signals an output signal which corresponds to a diaphragm value which is greater than the maximum set diaphragm aperture, at the inverting inputs of the two sum-and-difference amplifiers 9 and 10 there is a lower signal voltage than at the non-inverting inputs. While this time the operational amplifier 9 remains ineffective, since there is a positive signal voltage at its output, at the output of the sum-and-difference amplifier 10 there is a positive signal voltage which passes by way of the diode 14 to the input of the second totalling amplifier 8. Here again the signal derived from the set time is superimposed with this correction signal, while at the output of the totalling amplifier 8 a signal occurs which corresponds to an exposure time longer than that which was set on the potentiometer 7. Here again the occurring regulating operation is so quick that the time control device, the diaphragm control device and the indicator device are charged merely with the regulated or corrected signal.

(2.) If the exposure control system is to work as "automatic timer", that is in a manner in which the diaphragm stop is fixedly predetermined and the requisite exposure time is automatically formed, the switch 15 is to be transferred into its first closure position in which it bridges over the diode 13. The potentiometer tapping of the potentiometer 12 is again driven to its stop so that the non-inverting input of the second sum-and-difference amplifier 10 is charged with center potential. The desired diaphragm aperture is set on the potentiometer 11. The position of the potentiometer 7 is arbitrary.

Again an output signal is formed from the three input signals from measured light value, film sensitivity and arbitrary time setting present on the total input of the first totalling amplifier. Since the blocking action of the diode 13 is eliminated, the output of the first sum-and-difference amplifier 9 is constantly connected with the totalling input of the second totalling amplifier 8, and a regulating operation takes place until the signal voltage at the output of the first totalling amplifier 5 and that at the inverting input of the first sum-and-difference amplifier 9 are equal. This is the case when at the output of the first totalling amplifier 5 there is a signal which corresponds to the diaphragm value set on the potentiometer 11. Thus for each diaphragm value set on the potentiometer 11 the optimum exposure is formed automatically, taking into consideration the measured subject brightness and the introduced film sensitivity. The sum-and-difference amplifier 10 is without effect.

(3.) If the exposure control system is to work in manual operation, that is to say the diaphragm and the time are set fixedly and invariably, then either the switch 15 is to be transferred into its second or right-hand closure position in which it connects the output of the sum-and-difference amplifier 9 with its inverting input, or the transistor 17 is to be made conductive, which takes place by means of the pulse generator 18 during the long pulse duration of the positive pulse. Thus the output of the sum-and-difference amplifier 9 is fed back directly to its inverting input, so that at the output and at the input of the sum-and-difference amplifier 9 and thus also at the output of the totalling amplifier 5 a signal forms which corresponds to the set diaphragm value. This value is transmitted directly to the diaphragm control circuit and to the indicator device. As a result of the diode threshold of the diode 13 and (since the switch 15 on actuation of the transistor 17 can also be in its first closure position for automatic time system) as a result of the diode threshold of the diode 16, the output of the sum-and-difference amplifier 9 does not influence the input of the second totalling amplifier 8, so that the time signal introduced by the potentiometer 7 is merely inverted on the totalling amplifier 8 and is fed unchanged to the shutter time control device 20 and the indicator device 31 for the exposure time.

This circuitry of the exposure control system of a camera, which can be used in all kinds of still cameras, provides the possibility of operating a camera according to choice for example as described above as automatic timer, where the exposure time is formed automatically in dependence upon the introduced diaphragm stop, film sensitivity, and measured subject brightness, or as modified automatic diaphragm system, where the diaphragm is automatically set in dependence upon the predetermined exposure time, the film sensitivity, and the measured subject brightness and in which the predetermined time value is corrected if an optimum exposure cannot be set within the available camera diaphragm range, or according to choice as camera with manual diaphragm and time determination. This exposure control system of such assembly has the advantage over known control systems that it can be realized with commercial components with reasonable space requirement, while all previously known control circuits must be specially produced, on account of their complicated and extensive assembly, with a high degree of integration in what are called LSI-circuits so that they may be accommodated in the space available in the cameras.

While known digitally operating control circuits can form all exposure values only by steps and can be adjusted more or less only approximately to the optimum exposure value according to the fineness of the graduation of the steps, the exposure control system according to the present invention works steplessly and thus guarantees an optimum setting of diaphragm and time. Here again the circuitry expense, which is to be incurred in the case of digital systems on account of the compulsorily necessary sequence control for the diaphragm or time value calculator, is superfluous.

The amplifiers 5 and 8, referred to above as totalling amplifiers, are often known in the art as summing amplifiers, and the amplifiers 9 and 10, referred to above as sum and difference amplifiers, are frequently known in the art as differential amplifiers.

What is claimed is:

1. A camera comprising
   (a) first factor means for preselecting a value for one of the two exposure value factors of shutter speed and diaphragm aperture and for producing a first output signal in accordance with such preselected value,
   (b) light measuring circuit means for measuring brightness of a subject to be photographed and producing a second output signal in accordance with such brightness,
   (c) means for setting a film sensitivity value and producing a third output signal in accordance therewith,
   (d) means responsive to said first, second, and third output signals for determining an optimum value for the other of said two exposure value factors and for producing an optimum value signal in accordance therewith,
   (e) means for producing range limit signals indicating an available range of values for said other of said two factors,
   (f) comparator circuit means for comparing said optimum value signal with said range limit signals and producing a comparator output signal,
   (g) circuit means for conveying said comparator output signal to said first output signal to influence said first output signal produced by said first factor means,
   (h) gate means preventing transmission of said comparator output signal to said first output signal when said optimum value signal is within the range of said range limit signals and allowing such transmission when it is outside said range, thereby to modify said first output signal, and
   (i) means responsive to said first output signal produced by said first factor means as and when modified by said comparator output signal for controlling an operating value of said first factor.

2. A camera as defined in claim 1, wherein there are a first totalling amplifier (5) and a second totalling amplifier (8), circuit connections conducting said first output signal and said second output signal and an output from said second totalling amplifier to an input of said first totalling amplifier, a first sum-and-difference amplifier (9), a second sum-and-difference amplifier (10), circuit connections conducting an output of said first totalling amplifier to one input of each of said sum-and-difference amplifiers, circuit connections conducting a minimum range limit signal to a second input of said first sum-and-difference amplifier, circuit connections conducting a maximum range limit signal to a second input of said second sum-and-difference amplifier, circuit connections conducting an output of said first sum-and-difference amplifier to an input of said second totalling amplifier through a first diode (13) whose cathode is connected to said first sum-and-difference amplifier, and circuit connections conducting an output of said second sum-and-difference amplifier to an input of said second totalling amplifier through a second diode (14) whose anode is connected to said second sum-and-difference amplifier.

3. A camera as defined in claim 2, wherein all of said amplifiers are formed as operational amplifiers.

4. A camera as defined in claim 2, characterized by a switch (15) which in one position keeps said gate means constantly conductive.

5. A camera as defined in claim 4, characterized in that said switch (15) in its closed position bridges over said first diode (13).

6. A camera as defined in claim 4, wherein the means for producing range limit signals is set to produce signals for maximum range when said switch (15) is closed.

7. A camera as defined in claim 2, characterized in that said means for producing range limit signals comprises a first potentiometer (11) for setting the minimum range limit value and a second potentiometer (12) for setting the maximum range limit value, the potentiometers having tappings connected respectively to the first and second sum-and-difference amplifiers (9 and 10).

8. A camera as defined in claim 7, wherein upon closure of said switch (15) the potentiometer tapping is transferred into its zero position in which the maximum voltage is tapped.

9. A camera as defined in claim 2, characterized in that said means for producing range limit signals comprises potentiometer means having a tapping connected with one of said sum-and-difference amplifiers and having a potentiometer output connected with the other of said sum-and-difference amplifiers.

10. A camera as defined in claim 2, wherein said switch (15) has a further closure position in which it connects the output of the first sum-and-difference amplifier with that input of the first sum-and-difference amplifier which is connected to the output of said first totalling amplifier.

11. A camera as defined in claim 2, wherein the output of the first sum-and-difference amplifier (9) is connected with that input of the first sum-and-difference amplifier which is connected to the output of the first totalling amplifier (5) through a transistor (17) which is operable when the exposure value factors of the camera are to be set manually.

12. A camera as defined in claim 11, further comprising a pulse generator, characterized in that the base of said transistor (17) is connected with said pulse generator (18) which is switched on when the exposure factor values of the camera are to be set manually, the pulse sequence of which generator keeps the transistor conductive during a pulse period which is a multiple of the blocking time of said transistor.

13. A camera as defined in claim 12, characterized by a pulse generator switch (19) actuated upon switching over the camera into the manual manner of operation, for switching on the pulse generator (18).

14. A camera as defined in claim 13, characterized in that there is means including a bridge switch (15) forming a bridge across the first diode (13) in the closed position of the switch, said bridge including a third diode (16) connected oppositely to said first diode (13), said pulse generator switch (19) being coupled with the bridge switch (15) in such a way that the pulse generator switch is transferred into its closed position when the bridge switch is closed.

15. A camera as defined in claim 1, further comprising an indicator device for indicating the set values of at least one of said exposure factors, said indicator device including an analogue-converter (32) having an input connected with the output of one of said two totalling amplifiers (5 and 8), a de-coding circuit (33) having an input connected to an output of said converter and having a series of outputs, and a line (34) of a series of luminous diodes having respective inputs connected to the respective outputs of said de-coding circuit.

* * * * *